United States Patent [19]
Griffin

[11] Patent Number: 5,658,038
[45] Date of Patent: Aug. 19, 1997

[54] VEHICLE EXTENDER

[75] Inventor: Timothy Andrew Griffin, Scappoose, Oreg.

[73] Assignee: Freightliner Corporation, Portland, Oreg.

[21] Appl. No.: 369,724

[22] Filed: Jan. 6, 1995

[51] Int. Cl.⁶ .................................................. B62D 35/00
[52] U.S. Cl. ........................... 296/180.2; 296/180.1
[58] Field of Search ........................... 296/91, 180.1, 296/180.2, 180.3, 180.5; 105/1.1–1.3

[56] References Cited

U.S. PATENT DOCUMENTS

| | | | |
|---|---|---|---|
| 978,254 | 12/1910 | Winslow | 296/91 |
| 3,711,146 | 1/1973 | Madzsar et al. | 296/180.2 |
| 3,834,752 | 9/1974 | Cook et al. | 296/180.2 |
| 4,142,755 | 3/1979 | Keedy . | |
| 4,290,639 | 9/1981 | Herpel . | |
| 4,518,188 | 5/1985 | Witten . | |
| 4,746,160 | 5/1988 | Wiesenmeyer . | |
| 4,750,772 | 6/1988 | Haegert | 296/180.2 |
| 4,818,015 | 4/1989 | Scanlon . | |
| 4,883,307 | 11/1989 | Hacker et al. | 396/180.2 |
| 4,904,015 | 2/1990 | Haines . | |
| 5,078,448 | 1/1992 | Selzer et al. . | |

*Primary Examiner*—Dean Kramer
*Attorney, Agent, or Firm*—Klarquist Sparkman Campbell Leigh & Whinston, LLP

[57] ABSTRACT

A vehicle extender includes a flexible flap supported by a metal extender for closing the gap between the cab and trailer or between trailers of a semi-trailer truck. The flap and extender are preferably coupled together to permit these components to expand and contract relative to one another so that the flap resists buckling. In one preferred approach, the flap is slidably coupled to the extender, although a fastener may be used to hold the flap in place. In a specific form, the extender and flap have mating edges which are configured to engage one another. In another embodiment, the flap is indirectly coupled to the extender by a support.

51 Claims, 7 Drawing Sheets

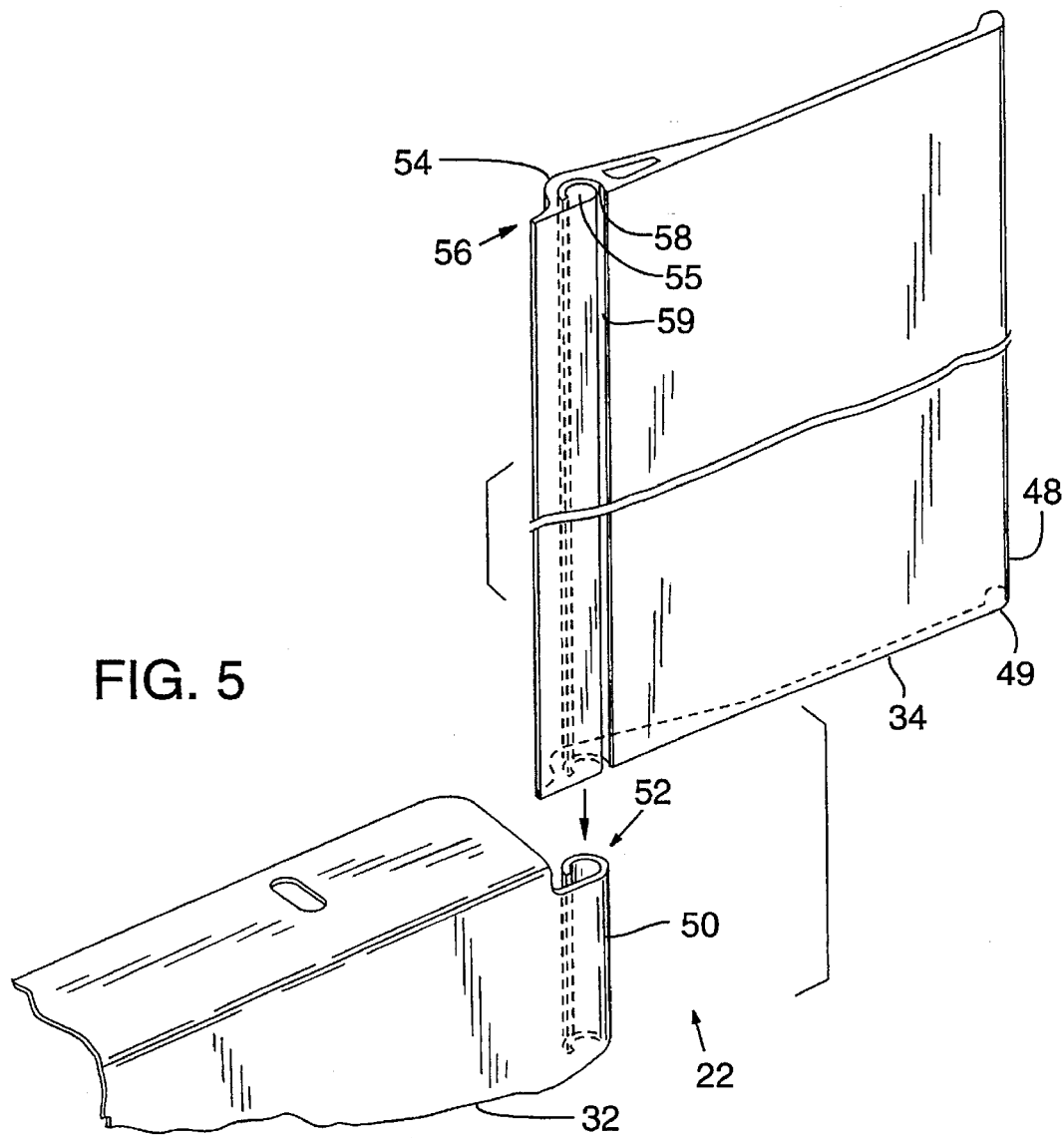

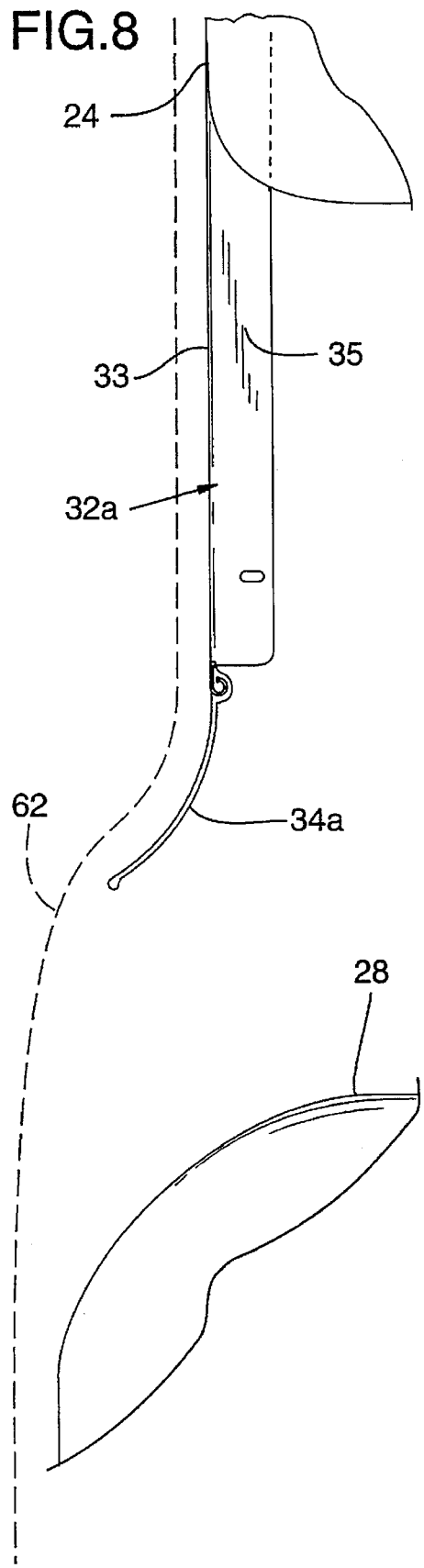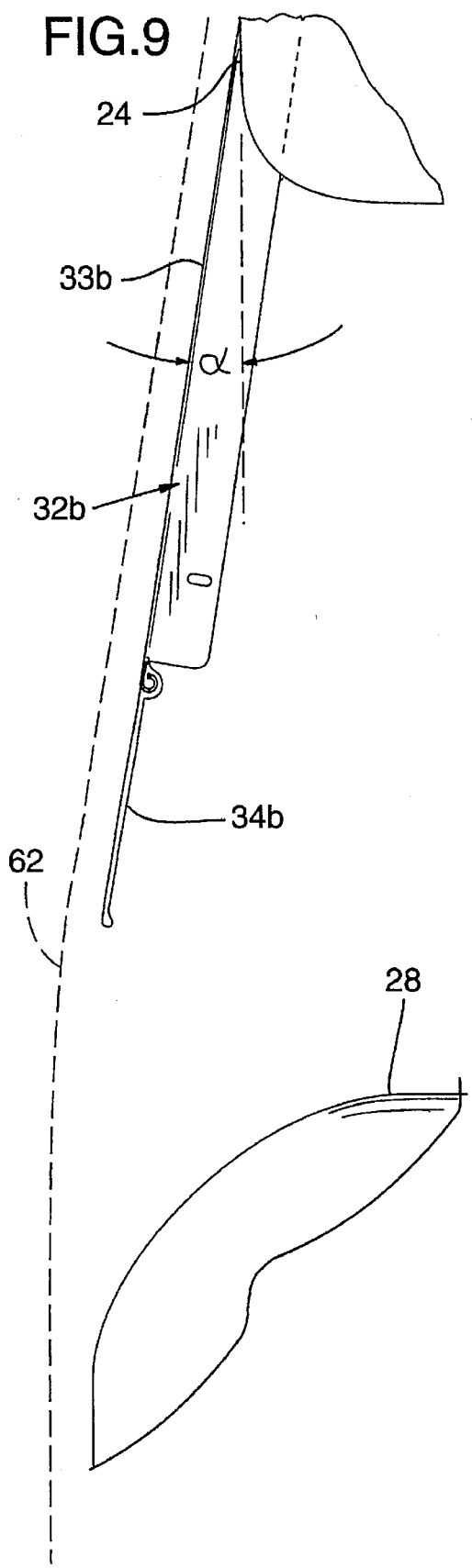

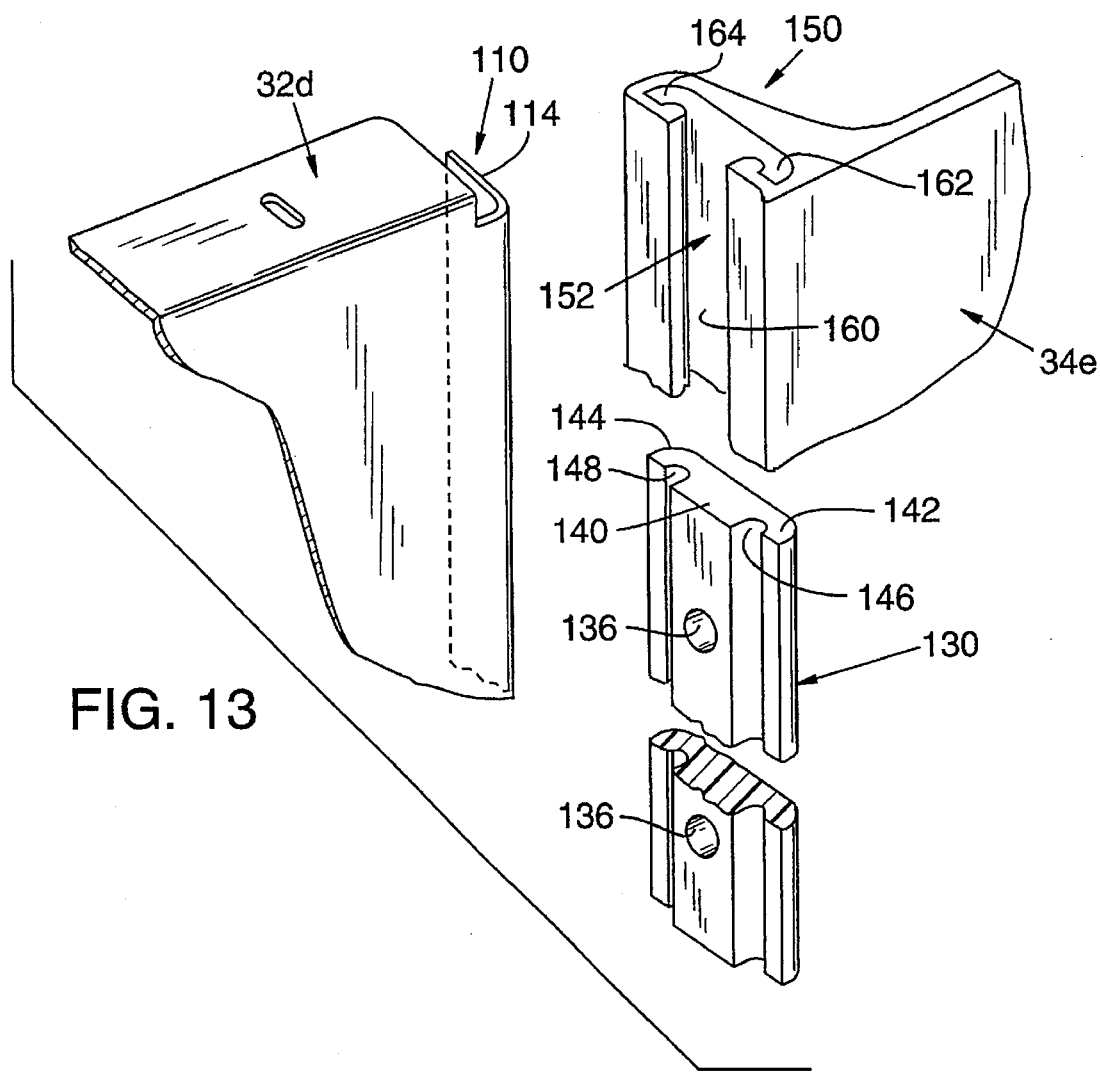
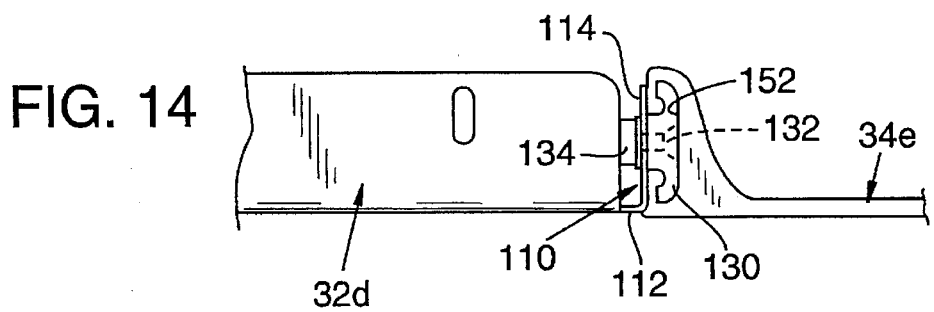
FIG. 13
FIG. 14

VEHICLE EXTENDER

FIELD OF THE INVENTION

The invention relates to an accessory for a cab or trailer of a semi-trailer truck used to direct air flow around a following or downstream trailer.

BACKGROUND

The gap between the tractor and trailer or between succeeding trailers of a semi-trailer truck causes aerodynamic drag and air turbulence which decreases the fuel efficiency and handling of the truck, especially at highway speeds. To enhance the aerodynamics of the truck, various accessories have been developed to direct air flow smoothly around downstream or following trailers. Such accessories include air fairings and various types of cab extenders to direct air flow over the roof and sides of the trailer.

Cab extenders along the side of a cab must be able to effectively direct airflow while accommodating the relative movement of the tractor and adjacent trailer or between two adjacent trailers during a turn. To allow this relative motion, some cab extenders include mechanical assemblies which enable wind deflectors to pivot about a mechanical joint during a turn. For example, such cab extenders may include relatively mechanically complex and expensive spring loaded panels that pivot as the truck turns and then spring back into a straight position.

Cab extenders incorporating a flexible plastic flap bolted or otherwise fastened by a multiplicity of fasteners to a metal extender element are known. With this construction, the plastic flap simply flexes in the event it impacts a trailer during a turn. Known cab extenders of this type are of multiple piece construction thereby adding to their expense; require multiple fasteners making them labor intensive to install and replace; and/or have flaps which wrinkle during use, thereby detracting from their appearance and causing them to wear out sooner.

Therefore, a need exists for an improved cab extender that individually or collectively addresses these and other drawbacks of existing designs.

SUMMARY OF THE INVENTION

One object of the invention is to provide an improved vehicle extender with a flexible flap that effectively directs air flow around a semi-trailer vehicle.

Another object of the invention is to provide an improved vehicle extender including a flexible flap that is easy to manufacture, install, and replace.

Yet another object of the invention is to provide an improved vehicle extender which includes a flexible flap in a construction which minimizes wrinkling of the flap.

All of the above objects need not be addressed by a vehicle extender in accordance with the present invention as the invention also encompasses vehicle extenders which address one or more of these objects as well as other objects.

In one embodiment, the invention comprises a vehicle extender including a first extender portion projecting partially across a gap between a vehicle cab or trailer and a following or downstream trailer. The extender may project into the regions between the sides of these components, or between the roofs of these components, or both. In this embodiment, a flexible flap is slidably received by the first extender portion and projects across a second portion of the gap. The sliding relationship between the flap and first extender portion facilitates installation, replacement and repair of the vehicle extender.

The first extender portion, which extends partially across the gap, may be connected along one side edge to a vehicle cab or trailer side or roof with its opposite or distal edge defining or supporting a flap connector to which the flap is mounted or coupled. In a preferred form, the distal edge of the first extender portion defines a channel or carries a flap support which defines a channel. The flap has a mating edge which slidably mates with the channel. Alternatively, the mating edge of the flap may define a channel for receiving the distal edge of the first extender portion. Gripping elements may be included on the distal edge or in the channel of the flap to increase the frictional engagement of the flap and first extender portion. The mounting edge may also be shaped to interlock with the flange end of the first extender portion to stabilize the construction and prevent the flap from pivoting along the axis of the channel.

Optional fasteners may be used to retain the flap in position relative to the first extender portion. However, any such fasteners are typically minimized to reduce installation expense. Also, by limiting the number of fasteners, the flap and first extender portion may expand and contract relative to one another. Therefore, thermal stresses arising from differential thermal coefficients of expansion of the first extender portion and flap are alleviated. These thermal stresses arise because of the varying environmental temperature conditions under which vehicles are operated. Consequently, rather than wrinkle or buckle to accommodate the thermal stresses, the flap tends to remain smooth and attractive and also tends to have a longer useful life.

The flap may be of varying shapes. For example, it may be curved to a predetermined extent for air deflection purposes. The flap may also include a bead or enlarged portion along its distal edge to reinforce the flap.

Also, the first extender portion may extend at any desired angle relative to the longitudinal axis of the truck. The angle of the first extender portion and the shape of the flap are typically selected to reduce the drag between the cab and/or trailer and a following trailer. With the present construction, a driver can easily exchange flaps depending on the width of the trailer and length of the gap. Preferably, although not necessarily, the first extender portion is of a standard size with adjustments for various vehicle configurations being made by selecting an appropriately dimensional flap. The flaps may be easily manufactured; for example, they may be made of plastic or other extrudable materials and continuously extruded with the flaps simply being cut to length.

The first extender portion may have a flap engaging flange which has a portion which is angled relative to the plane of the main body of the first extender portion. As an example, the flange may reverse direction at one location and extend or angle backwardly in a direction away from the main body portion of the flap. The flap engaging flange may have a plural angled cross-sectional configuration. In a particularly advantageous configuration, the flap engaging flange assumes an s-shaped cross-section and a correspondingly shaped channel or slot is provided in an enlarged flange engaging portion of the flap.

Although typically positioned along the sides of a vehicle, the cab extenders may extend across the gap from the roof of a vehicle toward a downstream trailer. Also, the cab extender may comprise a roof fairing of a vehicle with the rear edge of the fairing being coupled to the flap.

Additional advantages, features and objects of the invention will become apparent to those skilled in the art from the following description and accompanying drawings.

BRIEF DESCRIPTION OF THE DRAWINGS

FIG. 5 is an exploded partially broken away isometric view of a cab extender according to the first embodiment of the invention.

FIG. 6 is a top plan view of the cab extender of FIG. 5.

FIG. 7 is a cross-sectional view of the cab extender of FIG. 6.

FIG. 8 is a top plan view of a cab extender according to a second embodiment of the invention.

FIG. 9 is a top plan view of a cab extender according to a third embodiment of the invention.

FIG. 13 is a partially broken away exploded isometric view of a cab extender with a flap support mounted to a first cab extender portion.

FIG. 14 is a top plan view of an assembled cab extender of FIG. 13.

DETAILED DESCRIPTION

Figure 1:
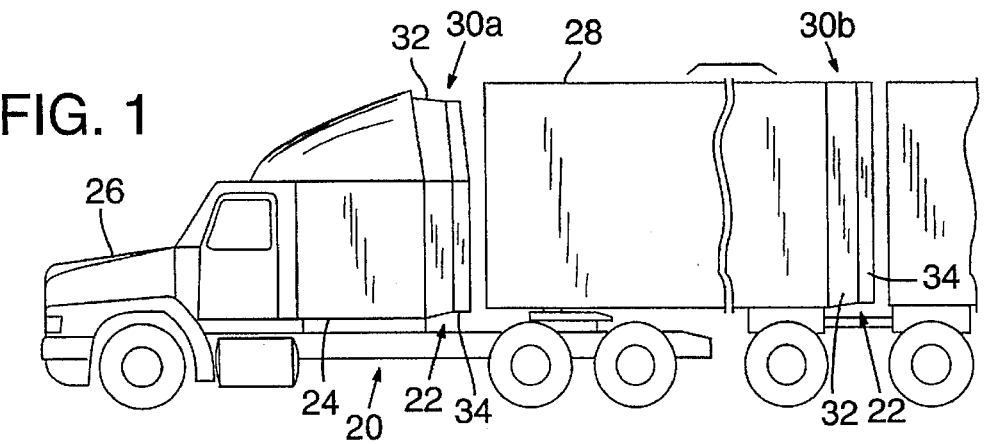
FIG. 1 is a side view of a semi-trailer truck having cab extenders according to a first embodiment of the invention.
Figure 2:
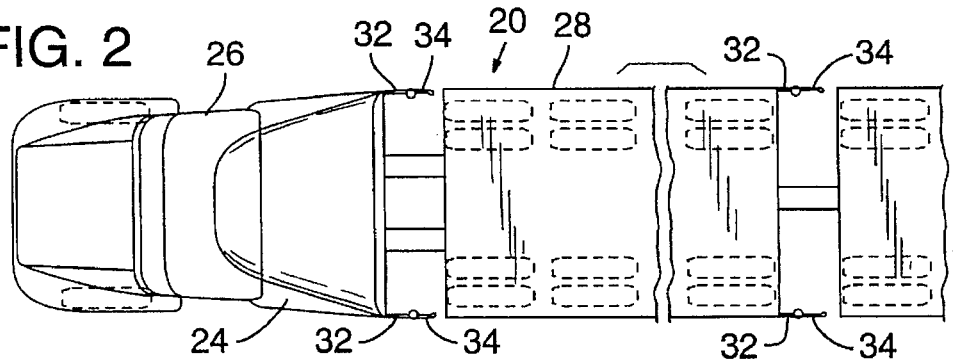
FIG. 2 is a top plan view of a semi-trailer truck having cab extenders according to the first embodiment of the invention positioned along the sides of a cab and along the sides of a trailer.

FIGS. 1 and 2 illustrate a semi-trailer truck 20 including cab extenders 22 according to an embodiment of the invention. While the cab extender 22 is primarily designed to close the gap 30a between the cab 24 of the tractor 26 and the trailer 28, the invention may be applied to the gap 30b between trailers as well. In addition, the cab extender may close the gap along the top of a tractor or trailer as well as along the sides thereof. As shown in greater detail in FIGS. 5 to 7, the illustrated cab extender 22 has two primary components or portions to fill these gaps: 1) an extender 32 typically mounted to the cab 24 and closing a portion of the gap 30a and/or 30b; and 2) a flexible flap 34 mounted to the extender 32 or coupled to the extender by a support and filling in a second portion of the gap 30a and/or 30b.

Figure 3:
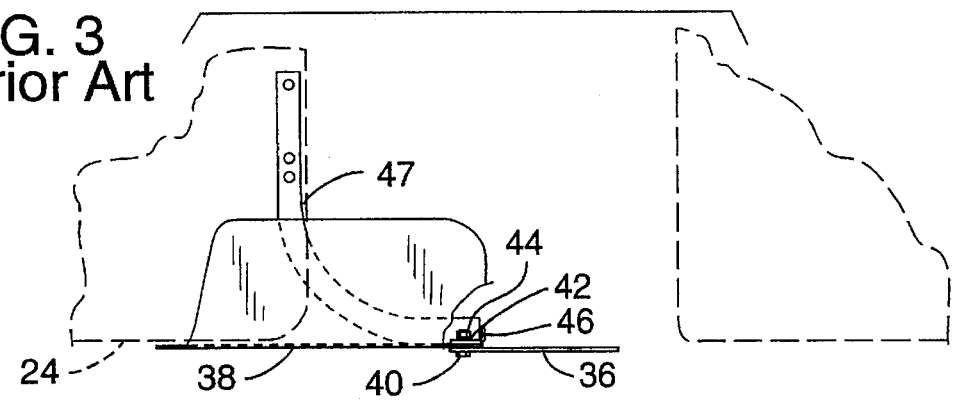
FIG. 3 is a top plan view of a prior art cab extender.
Figure 4:
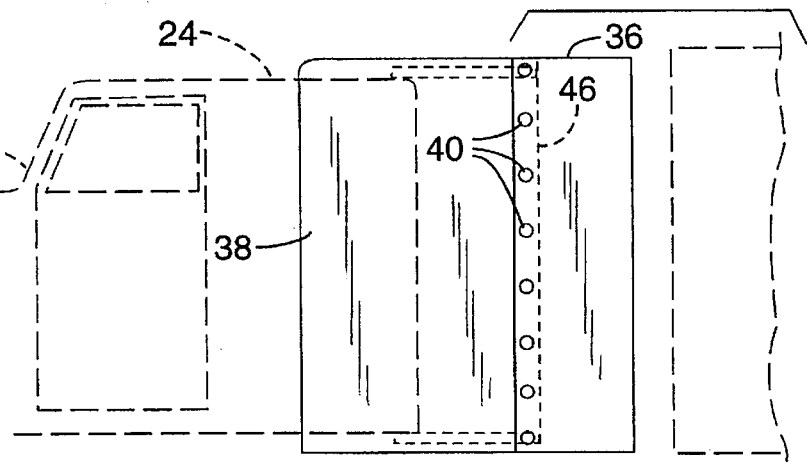
FIG. 4 is a side elevational view of the prior art cab extender of FIG. 3.

To contrast the invention with the prior art, it is helpful to explain a prior art cab extender before describing the details of embodiments of the present invention. FIGS. 3 and 4 depict a prior art cab extender having a plastic flap 36 connected to the end of a metal cab extender 38. The flap 36 is connected to the end of the extender 38 by a multiplicity of metal capscrews 40, washers 42, and nuts 44. When mounted in place, the flap is sandwiched between the metal extender and a metal reinforcing bracket 46. A metal bracket 47 holds the extender 38 at a desired angle relative to the cab 24. This prior art approach suffers from a number of drawbacks. For example, the flap 36 and the mounting apparatus 40-46 have different coefficients of thermal expansion. Consequently, during normal use the parts expand and contract at different rates. This is at an extreme when these components are exposed to bright summer desert sun or winter cold conditions. The resulting thermal stresses cause the plastic flap 36 to wrinkle and wear out prematurely when exposed to temperature changes. As another drawback, the number of fasteners required to secure the flap 36 to the extender 38 make it more time consuming to replace or exchange the plastic flap 36.

The embodiment of the invention shown in FIG. 5 includes an extender 32, which is preferably made of a rigid material such as sheet metal, with aluminum (0.06 inch thick) being a specific example. As shown in FIGS. 1 and 2, the extender 32 is typically fastened to a cab 24 or trailer 28 and extends rearwardly across a portion of the gaps 30a and/or 30b. To close a second portion of these gaps 30a, 30b, the embodiment further includes a flap 34. The flap 34 is made of a flexible material so that it will flex and bend without damaging a downstream trailer in the event the trailer is engaged by the flap during a turn. To increase the rigidity and durability of the flap 34, the distal end of the flap 48 may have an enlarged free edge, such as the rounded bead 49 extending the full length of the flap edge opposite to the flap edge which is coupled to the extender. In addition, the flap is preferably enlarged at the proximate or extender engaging edge to strengthen the flap where it is coupled to the extender. Although not required, most preferably the flap is enlarged along the entire proximate edge.

The flap 34 may be made of any of a number of flexible materials, but is preferably made of rubber or plastic. The flap 34 may even be made entirely of recycled plastic. Using plastic for the flap 34 simplifies its manufacture because the flap 34 may be easily extruded in its desired shape and simply trimmed to length. Specific exemplary materials for the flap include EPDM rubber and high density polyethylene (HDPE) plastic with the plastic presently being preferred. The thickness of the flap may vary, with one exemplary thickness being about 0.086 inch for HDPE and about 0.157 inch for EPDM rubber. The length of the flap is variable and typically corresponds to the top to bottom length of the gap. The width of the flap is also variable and is typically sized such that the flap and extender extend across about 50 to about 80 percent of the gap. Again, this is variable as the flap need only be wide enough to direct a significant portion of the air past the front of the downstream trailer. A typical flap is from about six to about twelve inches wide, and in a preferred form is about six inches wide.

As shown in FIGS. 5 and 6, the illustrated extender 32 and flap 34 slidably engage each other along adjacent side edges. The illustrated extender 32 has a flange edge 50 defining a channel 52 for receiving the flap 34. The channel 50 in this case may assume any convenient cross-sectional shape, and may be generally circular as shown. To simplify its manufacture, this flange end 50 may be constructed from sheet metal with a side edge rolled into the partial circle 50. The flap has a channel receiving proximate or side edge 54 for insertion into the channel 52 of the extender 32. The channel receiving edge 54 in this embodiment is shaped to fit into and mate with the channel defining wall of the flange edge 50. In this embodiment, the flap side edge 54 includes a portion 55 of generally circular cross-section which is inserted into the interior of the channel 52. The flap side edge 54 defines a slot 59 shaped to receive the correspondingly shaped flange edge 50. The portion 55 is typically sized slightly larger in cross-sectional dimension than the extender channel 52 so that, when inserted, portion 55 is deformed slightly and increases the frictional engagement of the flap to the extender. The channel receiving edge 54 may also include additional structure, such as the projecting lip edge 56 and extender engaging shoulder 58 which interlock the extender 32 and the flap. By interlock, it is meant that the structure, which may take other forms, prevents the flap 34 from pivoting or rotating relative to the extender 32. Because the extender 32 and flap 34 slidably engage each other, each portion may expand and contract relative to one another along the channel 52. As a result, the metal extender may expand and contract, for example, more rapidly than the flap 34 in response to temperature change, without wrinkling or thermally stressing the flap 34.

The extender and flap are preferably sized to tightly mate together in frictional engagement. As a result, fasteners are not required. However, a fastener which allows relative expansion of the components may be employed. For example, a single screw or bolt type fastener may join the flap and extender. Consequently, the components are free to expand and contract relative to one another (those portions above the fastener are unrestricted from relative sliding and those portions below the fastener are similarly unrestricted) so that the flap does not wrinkle or buckle as a result of thermal stresses. In contrast, if plural spaced-apart fasteners are used, a less preferred approach which may be used in the present invention, the portion of the flap between two fasteners could buckle unless relative motion is otherwise accommodated.

More specifically, FIGS. 6 and 7 illustrate a single self-tapping screw 60 that penetrates the extender and flap and firmly holds an inserted flap 34 in the channel 52 of the extender 32. The screw 60 is thus an additional optional means to ensure that the flap 34 does not loosen in the channel 52. Thus, while FIGS. 6 and 7 show a self-tapping screw, and such a fastener is typically employed, such a fastening device is neither needed nor required. As other examples, the flap 34 may be designed to snap into the flange 50 of the extender 32, or the flange 50 may simply be shaped to hold the channel receiving end 54 of the flap 34 in place. Alternatively, the flap 34 may be widened at the top such that this widened portion would engage the top of the channel 52 and comprise a stop to prevent the flap from sliding downward beyond the stop. Other stops may also be used.

The manner in which the flap 34 slidably engages the extender 32 facilitates the replacement or exchange of the flap 32. A cab may be provided with a standard extender, and the flap may changed as necessary to best close the gap depending upon factors such as the width of the cab relative to the trailer and the distance between the cab and trailer. While a standard width trailer is typically 96 or 102 inches wide, the cab width may vary substantially. The distance or width of the gap between cab and trailer may vary as well. As such, by providing flaps of different widths, a flap may be selected to more properly close the gap between the cab and trailer.

FIGS. 8 and 9 illustrate alternative embodiments of a cab extender which accommodates cabs of varying widths relative to a downstream trailer. In FIG. 8, the main body 33 of extender 32a (excluding an inwardly projecting top flange 35) is co-planar with the side of the cab 24, and the flap 34a is curved to direct airflow 62 around the trailer 28. In FIG. 9, the main body 33b of extender 32b is angled outwardly relative to the longitudinal axis and the side of the cab at an angle α. Although variable, α is typically between about zero and about thirty degrees. The flap 34b, coupled to the angled extender, is a substantially planar member which, together with the extender 32b, directs air flow 62 around the trailer 28. From FIGS. 8 and 9, it can be seen that the extender 32b may be standardized at a fixed angle α, relative to the longitudinal axis of the cab. In addition, the flaps may be manufactured of various curved or otherwise shaped configurations and then selected to divert air past a downstream trailer for a given cab width and gap.

FIGS. 10-19 illustrate alternative embodiments of cab extenders in accordance with the present invention and serve as examples of the many variations in configuration which the extender and flap may take.

Figure 10:
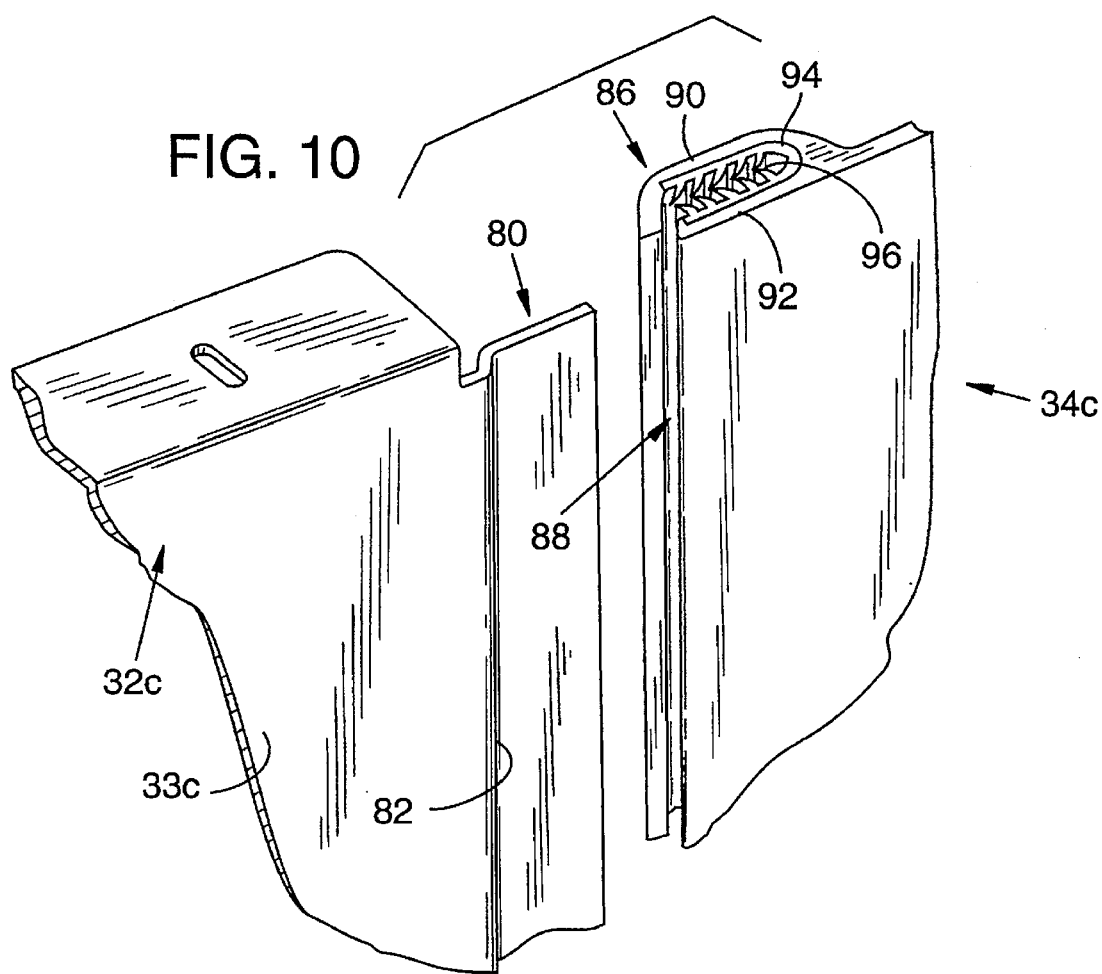
FIG. 10 is a partially broken away exploded isometric view of another embodiment of the present invention showing one form of a flap with gripping elements.
Figure 11:
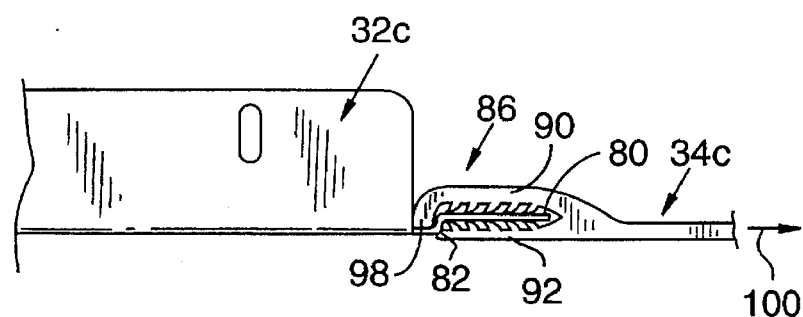
FIG. 11 is a top plan view of an assembled cab extender of FIG. 10.

With reference to FIG. 10, the extender 32c is provided with an elongated flap supporting edge or flange 80 with an inward step 82. That is, the edge 80 comprises a flange which is curved or bent in the direction of the cab (when the extender is mounted) and then curved again to extend parallel to the main body 33c of extender 32c. This is one example of a flange with a cross-section having plural angles. In this embodiment, the flap 34c includes an elongated enlarged gripping edge 86 for engaging the edge 80 of extender 32c. More specifically, gripping edge 86 defines a slot 88 for receiving the edge 80 of the extender as shown in FIG. 11. The edge 86 of flap 34c has a y-shaped cross-section and is split into a pair of elongated legs 90, 92 which define the slot 88 between them. An optional elongated gripping element 94 may be formed integrally with the legs 90, 92, for example as the legs are extruded, as shown in FIG. 11. Alternatively, the gripping element 94 may comprise a separate piece which is retained between the legs 90, 92. For example, the gripping element may comprise an elongated spring steel element which is positioned between legs 90, 92 as the flap 34c is extruded. The gripping element 94 may include gripping teeth 96 which are angled backwardly toward the slot 88 to more securely clamp the edge 80 of the extender in place following the insertion of the edge 80 into the slot 88.

As shown in FIG. 11, the leg 90 may have a lip 98 which is outwardly turned to bear against the inward portion of the step 82 to resist forces applied to the flap in the direction of arrow 100. As shown in FIG. 11, in this embodiment the leg 92 typically terminates short of the leg 90 at the location of the step 82 so that leg 92 is not spread apart from leg 90 by the step 82.

Figure 12:
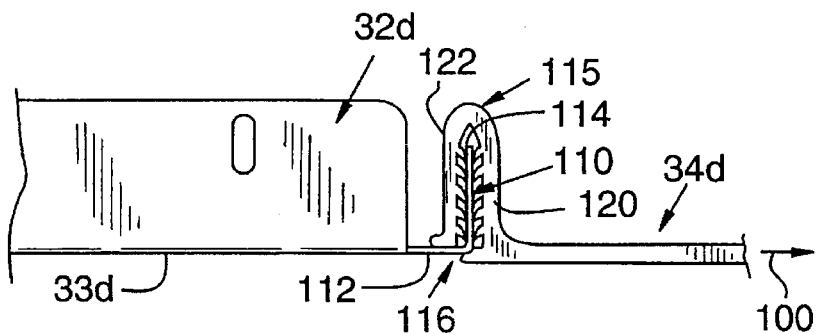
FIG. 12 is a top plan view of an assembled modified version of the cab extender of FIG. 10.

In the FIG. 12 embodiment, the extender 32d has a flap supporting elongated edge or flange 110 having first and second legs 112, 114. The leg 112 extends generally in the plane of the major panel portion 33d of the extender 32d, whereas the leg 114 is bent inwardly, typically at a right angle, relative to the leg 112. In the FIG. 12 embodiment, the proximate edge of flap 34d is enlarged and defines a slot or extender flange receiving channel having an opening indicated at 116. The channel in this case extends in a direction generally parallel to the plane of the elongated leg flange 114 and is defined by a generally u-shaped or doubled-back extension of the flap 34d. That is, the flap 34d has an enlarged extender engagement edge 115 formed by extending the flap 34b along a leg 120 parallel to one surface of the leg 114 and looping or doubling back the flap back along a leg 122 parallel to the opposite surface of leg 114. Gripping teeth may be included (shown but not numbered in FIG. 12) in the channel between the legs 120, 122 in the same manner described above in connection with FIGS. 10 and 11. Because the channel defined by edge 115 of the flap is perpendicular to the plane of the main body of the flap, this construction offers significant resistance to forces applied in the direction of arrow 100 along the plane of the flap.

The flaps may also be indirectly supported by or coupled to the extender, as such is shown by way of an example in FIGS. 13 and 14. In these figures, the extender, which is shown in the form described above as 32d, carries an intermediate support indicated at 130. The support may be of the same material as the extender, of the flap, or of any other suitable material. The support 130 is fastened, for example by flat-head screws and nuts 132, 134 (one of each being shown in FIG. 14). The screws extend through openings 136 in the support 130 and corresponding openings (not shown) in the leg edge 110 of the cab extender 32d. This approach is less preferred because of the increased number of parts and added assembly time.

The illustrated support 130 is of a generally t-shaped cross-section, having a central stem 140 and side legs 142, 144. Each of these side legs is undercut to define a respective groove 146, 148 extending along the length of the support. The flap 34e has an enlarged support engaging edge 150 which extends generally normal to the plane of the main body of the flap 34e. A groove or channel 152 is defined along the length of the edge 150. The groove 152 is of a cross-sectional dimension which matches the cross-sectional dimension of the support 130. Therefore, the flap 34e may be slid or snapped onto the support 130, with the support 130 being disposed in the groove 152 as shown in FIG. 14. That is, the groove 152 includes a central stem receiving portion 160 and a pair of leg receiving portions 162, 164 which are defined by walls of the edge 150. Like the embodiment of FIGS. 5–7, the embodiments of FIGS. 8–14 may include optional fasteners. When such fasteners are used, it is most preferable that only one fastener be used so that the flaps are free to expand and contract above and below the fastener and relative to the extender. Again, this relieves thermal stresses that would otherwise result from differential coefficients of expansion of the extender and flap.

Figure 15:
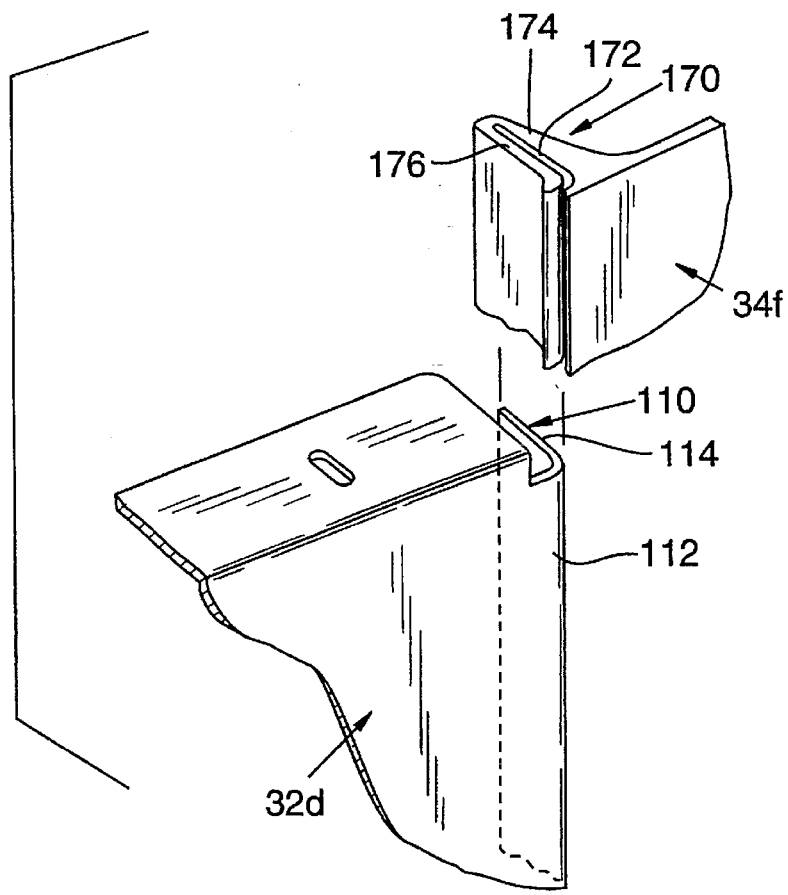
FIG. 15 is a partially broken away exploded isometric view of the cab extender of FIG. 12 without gripping elements.
Figure 16:
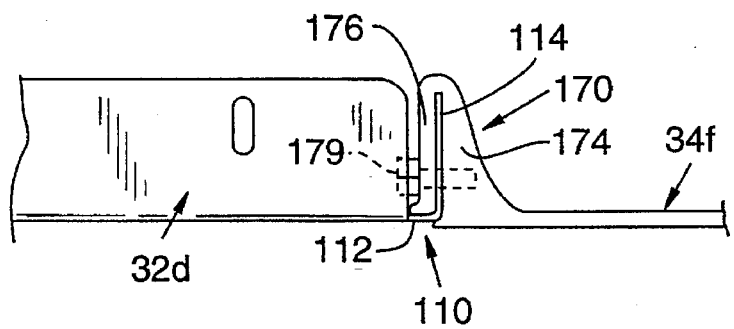
FIG. 16 is a top plan view of the cab extender of FIG. 15 with a single threaded fastener.
Figure 17:
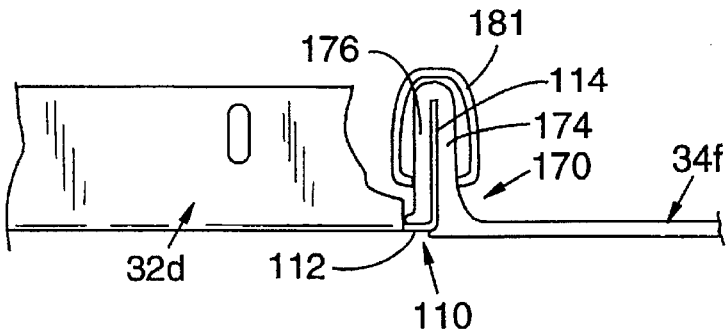
FIG. 17 is a top plan view of the cab extender of FIG. 15 with an elongated clip fastener.

Yet another form of flap 34f is shown in FIGS. 15–17 with the extender shown in these figures taking the form of extender 32d described above. The flap 34f includes an enlarged extender gripping edge portion 170 which projects generally perpendicularly from the plane of the main body of the flap 34f. In many respects, the flap 34f is very similar to the flap 34d of FIG. 12. In the embodiment of FIG. 15, a groove or slot 172 is defined along the length of edge 170. The slot 172 is bounded along its sides by legs 174, 176 formed in the edge 170. The channel 172 receives the leg 114 of the extender 32d when assembled as shown in FIGS. 16 and 17. With this construction, the flap 34f is restrained by the legs 112, 114 of extender edge 110 and by the legs 174, 176 of the flap edge 170 from pivoting relative to the extender. In FIG. 16, a single bolt 179 is shown interconnecting the flap 34f and the leg 114 of the extender 32d. In FIG. 17, instead of a bolt, an elongated clip 181 is shown which surrounds the legs 174, 176 and clamps these legs against the extender by applying pressure to the legs at the location where the clip 181 engages the legs. Typically the clip 181 is formed of a durable and resilient material, such as spring steel.

Figure 18:
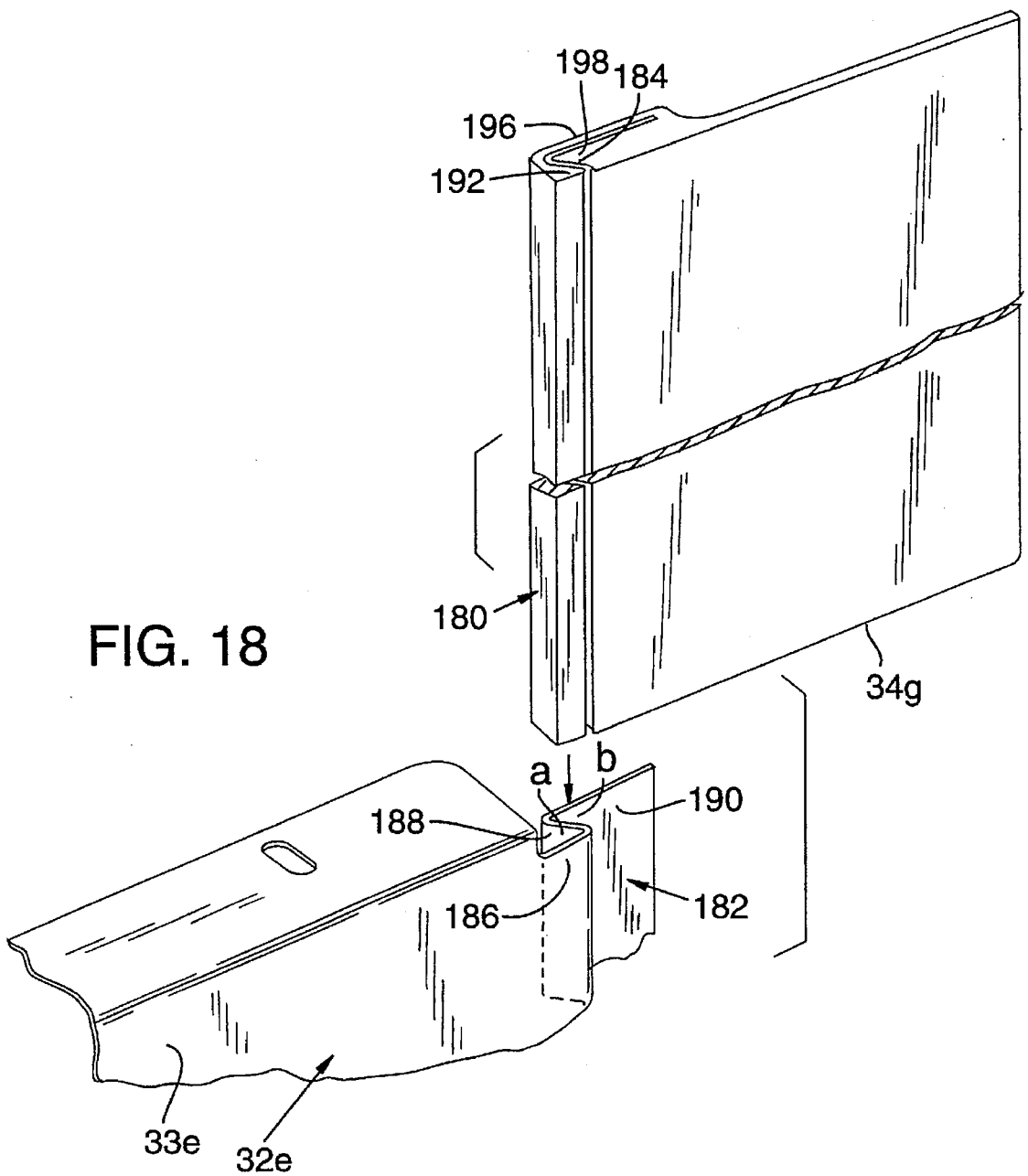
FIG. 18 is a partially broken-away exploded isometric view of another embodiment of the present invention.
Figure 19:
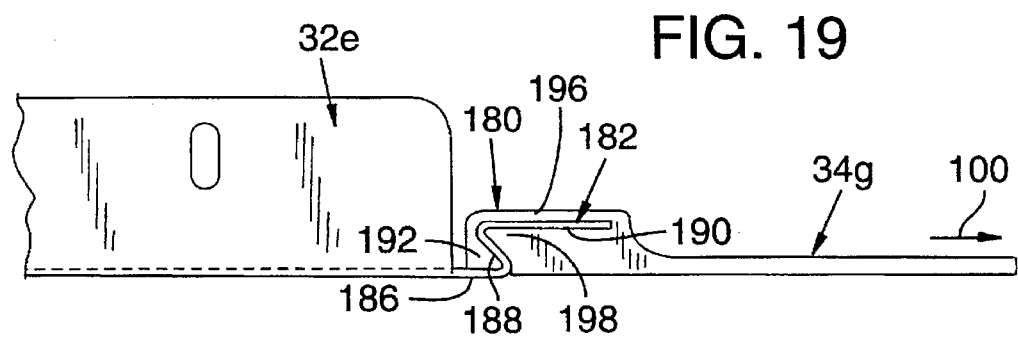
FIG. 19 is a top plan view of the cab extender of FIG. 18.

FIGS. 18 and 19 illustrate a presently most preferred embodiment of the invention, again including an extender portion 32e and deflector flap 34g. Flap 34g may be of the same materials as the other flaps as previously described. Flap 34g includes an enlarged proximate or flange engaging edge 180 and a distal edge, not shown, opposite to the proximate edge and which is typically formed with a reinforcement bead as shown in FIG. 5 for flap 34. In addition, extender 32e has an elongated flap engagement flange 182 which is configured in cross-sectional dimensions to mate within a like-shaped elongated slot 184 defined by edge 180 and extending along the length of the edge. The flange 182 has a cross-section which is of a complex plural angled configuration. More specifically, flange 182 has first, second and third sections 186, 188 and 190 with an angle "a" defined between sections 186 and 188, and an angle "b" defined between sections 180 and 190. The angles "a" and "b" are most preferably less than ninety degrees and are also most preferably equal to one another. With this configuration, sections 186 and 190 are parallel to the plane of the main body 33e of the extender while section 188 doubles back from section 186. With angle "a" being an acute angle in the preferred embodiment, an elongated lip 192 of the flap edge 180 nests within the angled area defined by sections 186 and 188 and locks the flap against movement that could otherwise be caused by forces applied in the direction of arrow 100. When viewed from above, in FIG. 19, it can be seen that the illustrated flange 182 in effect assumes an s-shaped cross-section. To resist lateral forces, perpendicular to arrow 100, flange section 190 is typically longer than flange section 186 and is securely engaged by legs 196, 198 of edge 180, the legs bounding and defining the slot or channel 184.

Having illustrated and described the principles of the invention in several preferred embodiments, it should be apparent to those skilled in the art that the invention may be modified in arrangement and detail without departing from such principles. I claim all modifications and equivalents falling within the spirit and scope of the following claims.

I claim:

1. A vehicle extender for at least partially closing the gap between an upstream vehicle and a downstream or towed trailer, the extender comprising:

an extender portion for support by the vehicle to extend from the vehicle across a first portion of the gap, the extender portion having an elongated extender edge, wherein the elongated extender edge comprises a curved or angled flange having a curved or angled cross-section and having first and second opposing sides;

a flap of a flexible material having an elongated flap edge portion mounted to the extender edge, the flap extending from the extender portion across a second portion of the gap, the flap edge portion being slidably coupled to the extender edge so as to permit relative expansion and contraction of the flap edge portion and the extender edge, wherein the flap edge comprises a slot shaped to receive the curved or angled flange and to surround the first and second opposing sides of the flange.

2. A vehicle extender according to claim 1 including a single fastener which penetrates the extender edge and flap edge portion and secures the flap edge portion to the extender edge while permitting relative expansion and contraction of the flap and extender portion above and below the fastener.

3. A vehicle extender according to claim 1 including a clip which is positioned to clamp the flap edge portion against the received flange.

4. A vehicle extender according to claim 1 in which the extender edge defines a channel and in which the flap edge portion includes a channel engaging portion positioned within the channel.

5. A vehicle extender according to claim 4 in which the extender edge defines a channel of generally circular cross-section and in which the channel engaging portion of the flap edge portion includes a section of generally circular cross-section disposed within the channel.

6. A vehicle extender according to claim 4 in which the flap edge portion includes an extender edge engagement structure which limits relative pivoting of the flap and extender portion.

7. The vehicle extender of claim 4 wherein the extender edge comprises a rolled piece of metal which defines the channel.

8. A vehicle extender according to claim 1 in which the flange has an angled cross section including at least one acute angle.

9. A vehicle extender according to claim 1 in which the curved or angled flange has an s-shaped cross-section.

10. The vehicle extender of claim 1 wherein the flap includes a flap distal edge opposite to the flap edge portion, the flap distal edge having an enlarged cross-section.

11. The vehicle extender of claim 1 wherein the flap is curved to deflect wind around the downstream trailer.

12. The vehicle extender of claim 1 wherein the extender portion extends at an angle of from about zero to about thirty degrees relative to the longitudinal axis of the vehicle.

13. The vehicle extender of claim 12 wherein the flap is curved to deflect wind around the downstream trailer.

14. A vehicle extender flap of the type which is coupled to an extender having a flange that is curved or angled in at least one direction so that it has an angled or curved cross section and which at least partially closes the gap between an upstream vehicle and a downstream or towed trailer, the flap comprising:

an elongated body of a flexible material having first and second opposed side edges; and the first side edge of the flap defining a slot or channel sized and shaped to define an angled or curved cross section that surrounds and engages the flange.

15. A vehicle extender flap according to claim 14 including a section bounded by the slot of generally circular cross-section.

16. A vehicle extender flap according to claim 14 in which the second side edge of the flap is of an enlarged cross-section.

17. vehicle extender flap according to claim 14 which includes gripping elements within the slot.

18. A vehicle extender flap according to claim 14 in which the flap includes a leg positioned to engage the extender to restrict relative pivoting movement of the flap and extender.

19. A vehicle extender flap according to claim 14 which has a body with a curved cross-section for deflecting wind when the flap is mounted to the extender.

20. A vehicle extender according to claim 14 in which the first side edge of the flap is enlarged.

21. A vehicle extender according to claim 14 in which the slot includes at least one acute angle.

22. A vehicle extender according to claim 14 in which the slot is s-shaped.

23. A vehicle extender for at least partially closing the gap between an upstream vehicle and a downstream or towed trailer, the extender comprising:

an extender portion for support by the vehicle to extend from the vehicle across a first portion of the gap, the extender portion having an elongated extender edge comprising a curved or angled flange having a curved or angled cross-section and having first and second opposing sides; and a flap of a flexible material having an enlarged elongated mounting edge which defines a slot having a curved or angled cross section sized to slidably receive the the flange and to engage the first and second opposing sides of the flange, the flap extending from the extender edge across a second portion of the gap.

24. A truck with vehicle extenders comprising:

a truck having a body supported by tires and powered by an engine, the truck including a cab with first and second sides and a rear wall;

first and second vehicle extenders, each projecting rearwardly of the rear wall and being positioned at a respective side of the cab;

each such vehicle extender comprising an extender portion for support by the vehicle to extend from the vehicle across a first portion of the gap, the extender portion having an elongated extender edge comprising a curved or angled flange having a curved or angled cross-section and having first and second opposing sides, and a flap of a flexible material having an enlarged elongated mounting edge which defines or slot having a curved or angled cross section sized for slidable coupling to the flange and for engaging the first and second opposing sides of the flange, the flap extending from the extender edge across a second portion of the gap.

25. A truck with vehicle extenders according to claim 24 wherein each vehicle extender includes a flap support mounted to the extender, wherein the flap support includes the flange and wherein the flap is slidably mounted to the flap support and coupled to the extender edge by the support.

26. A truck with vehicle extenders according to claim 25 in which the extender has a flap slot slidably receiving the extender edge and a single fastener which penetrates the extender edge and flap edge portion and secures the flap edge portion to the extender edge while permitting relative expansion and contraction of the flap and extender portion above and below the fastener.

27. A truck with vehicle extenders according to claim 25 in which the extender edge defines a channel and in which the flap edge portion includes a channel engaging portion positioned within the channel.

28. A truck with vehicle extenders according to claim 25 in which the extender edge defines a channel of generally circular cross-section and in which the channel engaging portion of the flap edge portion includes a section of generally circular cross-section disposed within the channel.

29. A truck with vehicle extenders according to claim 25 wherein the flap includes a flap distal edge opposite to the flap edge portion, the flap distal edge having an enlarged cross-section.

30. A truck with vehicle extenders according to claim 25 wherein the flap is curved to deflect wind around the downstream trailer.

31. A truck with vehicle extenders according to claim 25 wherein the extender portion extends at an angle of from about zero to about thirty degrees relative to the longitudinal axis of the truck.

32. A vehicle extender for at least partially closing the gap between an upstream vehicle such as a cab or trailer and a downstream or towed trailer, the extender comprising:

an extender portion for support by the vehicle to extend from the vehicle across a first portion of the gap, the extender portion having an elongated extender edge, the extender edge comprising a flange;

a flap of a flexible material having an elongated flap edge portion coupled to the extender edge, the flap extending from the extender portion across a second portion of the gap, the flap edge portion being slidably coupled to the extender edge so as to permit relative expansion and contraction of the flap edge portion and the extender edge, the flap edge portion defining a single flange receiving channel or slot which receives the flange.

33. A vehicle extender according to claim 32 including a clip which is positioned to clamp the flap edge portion against the received flange.

34. A vehicle extender for at least partially closing the gap between an upstream vehicle and a downstream or towed trailer, the extender comprising:

an extender portion for support by the vehicle to extend from the vehicle across a first portion of the gap, the extender portion having an elongated extender edge, wherein the extender edge comprises a flange having a cross-section which includes at least one acute angle;

a flap of a flexible material having an elongated flap edge portion mounted to the extender edge, the flap extending from the extender portion across a second portion of the gap, the flap edge portion being slidably coupled to the extender edge so as to permit relative expansion and contraction of the flap edge portion and the extender edge.

35. A vehicle extender according to claim 34 in which the extender edge comprises a flange of an s-shaped cross-section.

36. A vehicle extender according to claim 34 including a single fastener which penetrates the extender edge and flap edge portion and secures the flap edge portion to the extender edge while permitting relative expansion and contraction of the flap and extender portion above and below the fastener.

37. A vehicle extender for at least partially closing the gap between an upstream vehicle and a downstream or towed trailer, the extender comprising:

an extender portion for support by the vehicle to extend from the vehicle across a first portion of the gap, the extender portion having an elongated extender edge;

a flap of a flexible material having an elongated flap edge portion mounted to the extender edge, the flap extending from the extender portion across a second portion of the gap, the flap edge portion being slidably coupled to the extender edge so as to permit relative expansion and contraction of the flap edge portion and the extender edge, wherein the flap includes a flap distal edge opposite to the flap edge portion, the flap distal edge having an enlarged cross-section.

38. A vehicle extender according to claim 37 including a single fastener which penetrates the extender edge and flap edge portion and secures the flap edge portion to the extender edge while permitting relative expansion and contraction of the flap and extender portion above and below the fastener.

39. A vehicle extender according to claim 37 in which the extender edge comprises a flange, the flap edge portion defining a channel or slot which receives the flange.

40. A vehicle extender according to claim 39 including a clip which is positioned to clamp the flap edge portion against the received flange.

41. A vehicle extender according to claim 37 in which the extender edge defines a channel and in which the flap edge portion includes a channel engaging portion positioned within the channel.

42. A vehicle extender according to claim 41 in which the extender edge defines a channel of generally circular cross-section and in which the channel engaging portion of the flap edge portion includes a section of generally circular cross-section disposed within the channel.

43. A vehicle extender according to claim 41 in which the flap edge portion includes an extender edge engagement structure which limits relative pivoting of the flap and extender portion.

44. The vehicle extender of claim 41 wherein the extender edge comprises a rolled piece of metal which defines the channel.

45. A vehicle extender flap of the type which is coupled to an extender and which at least partially closes the gap between an upstream vehicle and a downstream or towed trailer, the flap comprising:

an elongated body of a flexible material having first and second opposed side edges; and the first side edge of the flap defining a slot or channel sized and shaped to engage the side edge of the extender; and wherein the second side edge of the flap is of an enlarged cross-section.

46. A vehicle extender flap according to claim 45 including a section bounded by the slot of generally circular cross-section.

47. A vehicle extender flap according to claim 45 which includes gripping elements within the slot.

48. A vehicle extender flap according to claim 45 in which the flap includes a leg positioned to engage the extender to restrict relative pivoting movement of the flap and extender.

49. A vehicle extender according to claim 45 in which the slot includes at least one acute angle.

50. A vehicle extender according to claim 45 in which slot is s-shaped.

51. A truck with vehicle extenders comprising:

a truck having a body supported by tires and powered by an engine, the truck including a cab with first and second sides and a rear wall;

first and second vehicle extenders, each projecting rearwardly of the rear wall and being positioned at a respective side of the cab;

each such vehicle extender comprising an extender portion for support by the vehicle to extend from the vehicle across a first portion of the gap, the extender portion having an elongated extender edge, and a flap of a flexible material having an enlarged elongated mounting edge which defines a channel or slot sized for slidable coupling to the extender edge, the flap extending from the extender edge across a second portion of the gap;

wherein each vehicle extender includes a flap support mounted to the extender, wherein the flap is slidably mounted to the flap support and coupled to the extender edge by the support, and wherein the flap includes a flap distal edge opposite to the flap edge portion, the flap distal edge having an enlarged cross-section.

* * * * *

UNITED STATES PATENT AND TRADEMARK OFFICE
CERTIFICATE OF CORRECTION

PATENT NO. : 5,658,038

DATED : August 19, 1997

INVENTOR(S) : Timothy A. Griffin

It is certified that error appears in the above-indentified patent and that said Letters Patent is hereby corrected as shown below:

Column 9, line 45, "17.vehicle" should read --17. A vehicle--.

Column 10, line 22, "defines or slot" should read --defines a slot--.

Signed and Sealed this

Twenty-fifth Day of August, 1998

Attest:

BRUCE LEHMAN

*Attesting Officer*  *Commissioner of Patents and Trademarks*